United States Patent [19]

Olliver

[11] Patent Number: 5,502,541
[45] Date of Patent: Mar. 26, 1996

[54] PHOTOGRAPHIC PRINTER AND METHOD FOR AUTOMATICALLY DETECTING PANORAMIC FORMAT IMAGE FRAMES

[75] Inventor: Richard Olliver, Rochester, N.Y.

[73] Assignee: Eastman Kodak Company, Rochester, N.Y.

[21] Appl. No.: 240,189

[22] Filed: May 10, 1994

[51] Int. Cl.$^6$ ............................................. G03B 27/52
[52] U.S. Cl. ............................ 355/38; 355/41; 355/68; 250/206.1
[58] Field of Search ........................... 355/40, 41, 68, 355/70, 38; 250/206.1

[56] References Cited

U.S. PATENT DOCUMENTS

| | | | |
|---|---|---|---|
| 4,159,174 | 6/1979 | Rising | 355/38 |
| 4,673,815 | 6/1987 | Fruth et al. | 250/548 |
| 4,804,149 | 9/1989 | Matsumoto | 355/41 |
| 4,947,205 | 8/1990 | Benker et al. | 355/41 |
| 5,128,711 | 7/1992 | Terashita et al. | 355/41 |
| 5,214,408 | 5/1993 | Seto | 355/41 |
| 5,260,740 | 11/1993 | Seto | 355/41 |
| 5,289,229 | 2/1994 | Manico et al. | 355/41 |

*Primary Examiner*—Michael L. Gellner
*Assistant Examiner*—D. P. Malley
*Attorney, Agent, or Firm*—Francis H. Boos, Jr.

[57] ABSTRACT

An automatic photographic printer is programmed to determine, from image classification pixel scan data, the existence of panoramic image frames interspersed among full size image frames on a film strip. The printer is initially set to assume all image frames are panoramic images until any one of the following test conditions is found that then indicates the image is not panoramic: (a) an initial pixel value indicates the existence of film density, (b) differences in pixel density values in rows within the non-panoramic areas of the frame indicate the existence of film density or (c) pixel density values on opposite sides of a line separating panoramic from non-panoramic frame areas indicate the absence of a frame edge.

11 Claims, 6 Drawing Sheets

| FIG. 4A | FIG. 4B |

FIG. 4

| 18 | 19 | 20 | 21 | 22 | 23 | 24 | 25 | 26 | 27 | 28 | 29 | 30 | 31 | 32 | 33 | 34 | 35 |
|----|----|----|----|----|----|----|----|----|----|----|----|----|----|----|----|----|----|
| 54 | 55 | 56 | 57 | 58 | 59 | 60 | 61 | 62 | 63 | 64 | 65 | 66 | 67 | 68 | 69 | 70 | 71 |
| 90 | 91 | 92 | 93 | 94 | 95 | 96 | 97 | 98 | 99 | 100 | 101 | 102 | 103 | 104 | 105 | 106 | 107 |
| 126 | 127 | 128 | 129 | 130 | 131 | 132 | 133 | 134 | 135 | 136 | 137 | 138 | 139 | 140 | 141 | 142 | 143 |
| 162 | 163 | 164 | 165 | 166 | 167 | 168 | 169 | 170 | 171 | 172 | 173 | 174 | 175 | 176 | 177 | 178 | 179 |
| 198 | 199 | 200 | 201 | 202 | 203 | 204 | 205 | 206 | 207 | 208 | 209 | 210 | 211 | 212 | 213 | 214 | 215 |
| 234 | 235 | 236 | 237 | 238 | 239 | 240 | 241 | 242 | 243 | 244 | 245 | 246 | 247 | 248 | 249 | 250 | 251 |
| 270 | 271 | 272 | 273 | 274 | 275 | 276 | 277 | 278 | 279 | 280 | 281 | 282 | 283 | 284 | 285 | 286 | 287 |
| 306 | 307 | 308 | 309 | 310 | 311 | 312 | 313 | 314 | 315 | 316 | 317 | 318 | 319 | 320 | 321 | 322 | 323 |
| 342 | 343 | 344 | 345 | 346 | 347 | 348 | 349 | 350 | 351 | 352 | 353 | 354 | 355 | 356 | 357 | 358 | 359 |
| 378 | 379 | 380 | 381 | 382 | 383 | 384 | 385 | 386 | 387 | 388 | 389 | 390 | 391 | 392 | 393 | 394 | 395 |
| 414 | 415 | 416 | 417 | 418 | 419 | 420 | 421 | 422 | 423 | 424 | 425 | 426 | 427 | 428 | 429 | 430 | 431 |
| 450 | 451 | 452 | 453 | 454 | 455 | 456 | 457 | 458 | 459 | 460 | 461 | 462 | 463 | 464 | 465 | 466 | 467 |
| 486 | 487 | 488 | 489 | 490 | 491 | 492 | 493 | 494 | 495 | 496 | 497 | 498 | 499 | 500 | 501 | 502 | 503 |
| 522 | 523 | 524 | 525 | 526 | 527 | 528 | 529 | 530 | 531 | 532 | 533 | 534 | 535 | 536 | 537 | 538 | 539 |
| 558 | 559 | 560 | 561 | 562 | 563 | 564 | 565 | 566 | 567 | 568 | 569 | 570 | 571 | 572 | 573 | 574 | 575 |
| 594 | 595 | 596 | 597 | 598 | 599 | 600 | 601 | 602 | 603 | 604 | 605 | 606 | 607 | 608 | 609 | 610 | 611 |
| 630 | 631 | 632 | 633 | 634 | 635 | 636 | 637 | 638 | 639 | 640 | 641 | 642 | 643 | 644 | 645 | 646 | 647 |
| 666 | 667 | 668 | 669 | 670 | 671 | 672 | 673 | 674 | 675 | 676 | 677 | 678 | 679 | 680 | 681 | 682 | 683 |
| 702 | 703 | 704 | 705 | 706 | 707 | 708 | 709 | 710 | 711 | 712 | 713 | 714 | 715 | 716 | 717 | 718 | 719 |
| 738 | 739 | 740 | 741 | 742 | 743 | 744 | 745 | 746 | 747 | 748 | 749 | 750 | 751 | 752 | 753 | 754 | 755 |
| 774 | 775 | 776 | 777 | 778 | 779 | 780 | 781 | 782 | 783 | 784 | 785 | 786 | 787 | 788 | 789 | 790 | 791 |
| 810 | 811 | 812 | 813 | 814 | 815 | 816 | 817 | 818 | 819 | 820 | 821 | 822 | 823 | 824 | 825 | 826 | 827 |
| 846 | 847 | 848 | 849 | 850 | 851 | 852 | 853 | 854 | 855 | 856 | 857 | 858 | 859 | 860 | 861 | 862 | 863 |

PHOTOGRAPHIC PRINTER AND METHOD FOR AUTOMATICALLY DETECTING PANORAMIC FORMAT IMAGE FRAMES

FIELD OF THE INVENTION

The invention relates generally to the field of photographic printers, and in particular to printers capable of discriminating panoramic format image frames on a film strip interspersed with full size format images on the film strip.

BACKGROUND OF THE INVENTION

Figure 2:
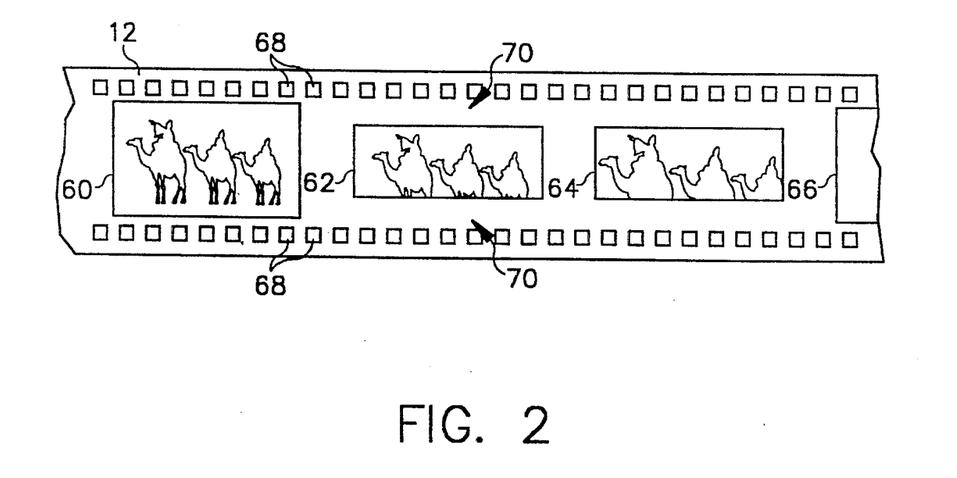
FIG. 2 is a diagram of a film strip illustrating full size and panoramic images interspersed on the film strip.

Photographic cameras are known which can expose intermixed image frames of different aspect ratios on the same film strip. As shown in FIG. 2, for 35 mm film these are typically full size size image frames 60, 66 with an aspect ratio of 24×36 mm and panoramic size image frames 62, 64 with an aspect ratio of approximately 13×36 mm. The reduced vertical dimension of the panoramic image frame is achieved in the camera by masking off the upper and lower portions of the exposure frame leaving unexposed spaces 70 above and below the panoramic image area on the film of a minimum film density value Dmin. When applied to a photographic printer, the panoramic image frame is magnified to be printed typically to a 3.5×10 inch (8.9×25.4 cm) or 4×12 inch (10.2×30.5 cm) positive print.

Currently on automatic photographic printers, however, the interspersed panoramic image frame are printed incorrectly. Since, the panoramic frames are intermixed with the standard full size image frames, the panoramic frames are printed to the full frame aspect ratio, typically 3.5×5 inches (8.9×12.2 cm). The resultant print is not only the incorrect size but also has large black strips on the top and bottom of the print. Thus there is a need for automatic printers, especially those that run at high speeds, to provide an automatic technique for recognizing the existence of a panoramic image frame so that the printer may print the image frame with the correct magnification and aspect ratio, or likely flag the frame to be skipped and printed later on another printer having suitable provision for printing panoramic image frames correctly.

High speed photographic printers operate at extremely high print rates. For example, the CLAS35 High Speed Printer produced by Eastman Kodak Company has a burst rate of 27,000 prints per hour. This corresponds to only 133 milliseconds per frame. Because of this any technique for automatically recognizing panoramic image frames must be very time efficient so that the printer's productivity is not adversely effected.

Commonly assigned U.S. Pat. No. 5,289,229, describes a technique for recognizing panoramic image frames interspersed on a film strip among full size image frames. In this disclosure, the film strip is scanned at a scan station in conventional manner to produce image pixel scan data used to derive exposure determination information for control of the exposure of the image frame to the print paper. Additionally, for image discrimination purposes, the scan data from a central region of the image frame are used to determine if an image exists in the image frame area. If so, then discrimination of the image between full size and panoramic format is performed. For this purpose, the scan data from upper and lower areas corresponding to areas 70 in FIG. 2 are tested to determine if image information exists in these outer areas and, if not, then a determination is made that a panoramic image frame exists. While this latter technique is theoretically capable of discriminating between panoramic and full size image frames for some scene images, it has been found that the reliability with which such discrimination can be made for the wide variety of scene images encountered in actual practice is somewhat limited and is therefore unsatisfactory for actual commercial application.

There is therefore a need for a reliable technique for use in automatic photographic printers for automatically discriminating between panoramic and full size image frames interspersed on the same film strip. There is a further need for such a technique that can be used in high speed printers without adversely affecting productivity of such printers. The present invention satisfies these needs.

SUMMARY OF THE INVENTION

According with one aspect of the invention, there is provided a method of discriminating between full size and panoramic image frames interspersed on a strip of film, a panoramic frame area being nested within a full size frame area leaving a non-panoramic frame area which is within the full size frame area but outside the panoramic frame area. The method comprises the steps of:

(a) determining from a film density data value of at least one pixel in the non-panoramic frame area if the image is a full size image and, if not, (b) then determining from film density data values of pixels in both the panoramic and non-panoramic frame areas if an edge exists between the two areas and, if so, the existence of a panoramic image is determined and, if not, a full size image is determined.

In another aspect of the invention, a photographic printer for discriminating between panoramic and full size image frames on a film strip, a panoramic frame area being nested within a full size frame area leaving a non-panoramic frame area which is within the full size frame area but outside the panoramic frame area. The printer comprises a film scanner for deriving film density data for each of a two-dimension matrix of pixels in an area spanning both the panoramic and non-panoramic frame areas, and pixel data processing means for processing the pixel density data to first determine from film density datum value of at least one pixel in the non-panoramic frame area if the image is a full size image and, if not, then to determine from film density data values of pixels in both the panoramic and non-panoramic frame areas if an edge exists between the two areas. The printer further comprises a print station adapted to print a non-panoramic print in the case of a full size image on the film and to operate in a predetermined alternate mode in the case of a panoramic image on the film, and printer control means responsive to the first determination for supplying a print mode control signal to a photographic printer only if a determination is made that a full size image exists, the output signal enabling the printer to print the image in the full size mode, and otherwise being responsive to the edge determination for supplying a control signal to the photographic printer to enable the print station to operate in the alternate mode if an edge is determined and to print the image in a full size mode if an edge is not detected.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
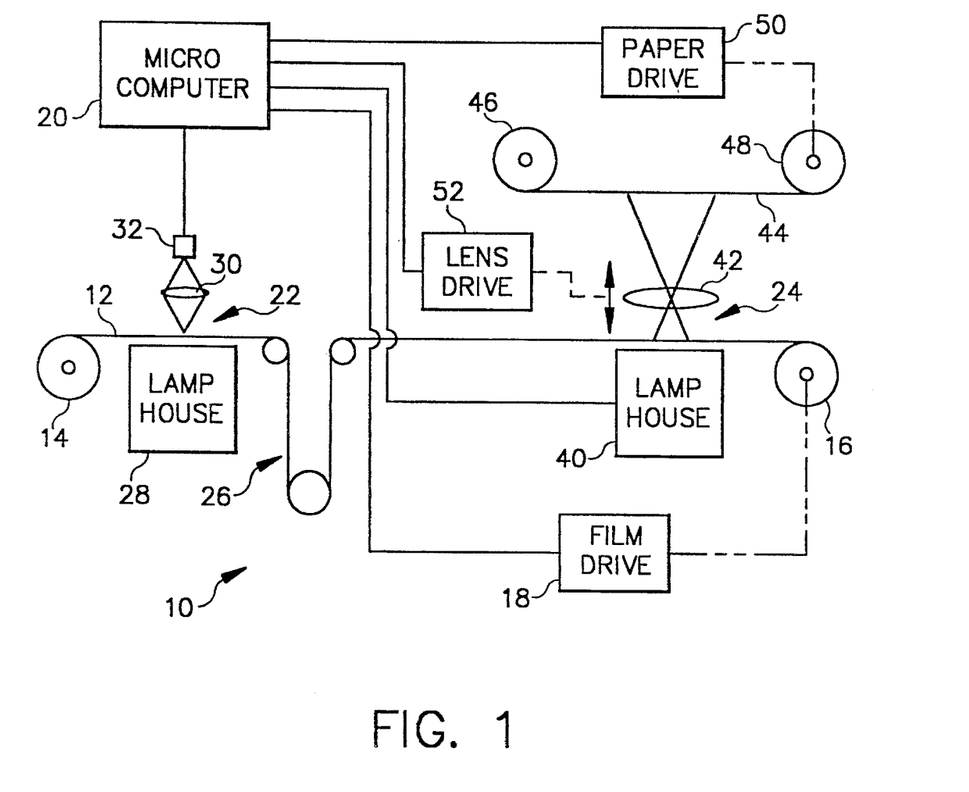
FIG. 1 is a schematic diagram of an automatic photographic printer of the type for which the present invention is useful.

In FIG. 1, there is shown the basic elements of an automatic photographic printer 10 designed in accordance with the present invention to discriminate between full size and panoramic format images. It should be noted here that the invention is useful in discriminating between images of any differing frame formats in which one is nested within the other leaving areas of the larger format size that are separated by a definable line or lines of demarcation from the smaller size frame. In the case of the existence on the film of an image of smaller size, these outer areas within the larger frame format area have no image density and this line of demarcation between the nested frame areas is represented by what is referred to herein as an "edge" meaning that film density corresponding to an image area exists within the larger frame format on only the one side of the line which corresponds to the smaller frame format area. It will be appreciated therefore that the expressions "full size" and "panoramic" are used herein for convenience in reference to specific examples of frame formats but are not intended to be limited thereto. In fact, the expressions "full size" and "non-panoramic" will be used interchangeably herein.

In the illustrated printer, a developed filmstrip 12, which may have interspersed full size and panoramic image frames as shown in FIG. 2, is advanced from a supply reel 14 to a takeup reel 16 by means of a film drive 18 under the control of a microcomputer 20. The filmstrip passes through a film scanner station 22 and a print station 24. An optional film loop buffer stage 26 of well known construction and operation may be provided to allow for any momentary differences in the film transport speeds between the film scanner station 22 and the film print station 24. At the scanner station, a lamp house 28 shines light through image frames on the filmstrip. The image is focused by means of optical lens 30 onto an electronic image sensor 32. Sensor 32 may be a CCD device or a photodiode device which converts light rays to electrical signals on an image pixel by pixel basis. Sensor 32 may be either a linear or an area array device. The resultant output of the scanner is a set of film density data for a two dimensional matrix of image pixels spanning both the panoramic and non-panoramic frame areas. The pixel signals are supplied to microcomputer 20 where they are converted to digital signals for storage and processing in the microcomputer.

At print station 24, a lamp house 40 shines light of desired spectral characteristics through image frames on film strip 12 which is focused by optical lens 42 onto a strip photographic print paper 44 extending between a paper supply reel 46 and a paper takeup reel 48. The spectral characteristics of the exposure light are influenced by color filters (not shown) in the lamphouse 40 controlled in accordance with an exposure algorithm in microcomputer 20 which, in turn, depends on the pixel scan data from the scanner station 22. The paper strip 44 is advanced by paper drive 50 under the control of microcomputer 20 in synchronism with advancement of filmstrip 12 through the print station so that successive images from the filmstrip are exposed onto corresponding successive print frame areas on the paper strip.

As an optional feature, if it is desired to print interspersed panoramic images on the filmstrip 12, a lens drive 52 may be provided to adjust the magnification of the film image onto the paper to adjust the width of the image on the print paper (vertical height as seen in the drawings) to the desired width as previously mentioned. The resultant longer dimension of the print image in the longitudinal direction of the paper strip is accommodated by suitably controlling paper drive 50 from computer 20 to adjust the paper advance to center the print frame with the film image frame. Such adjustments for panoramic printing, per se, are well known in the art.

In FIG. 2, a strip of film is shown which contains full size and panoramic size image frames. Frames 60 and 66 are full size frames whose cross dimensions, perpendicular to the longitudinal dimension of the film strip, occupy nearly all the space between the sprocket holes 68. Frames 62 and 64 are panoramic size frames in which the cross dimensions are significantly less than the full size frame. Typically, the longitudinal dimensions of both full size and panoramic size frames are the same. In standard 35 mm film, the full size frame is a 24×26 mm image area and the panoramic frame is typically a 13×36 mm image area. The regions 70 of the film strip lying outside the image frame areas are unexposed and have a minimum film density value, $D_{min}$.

Figure 3:
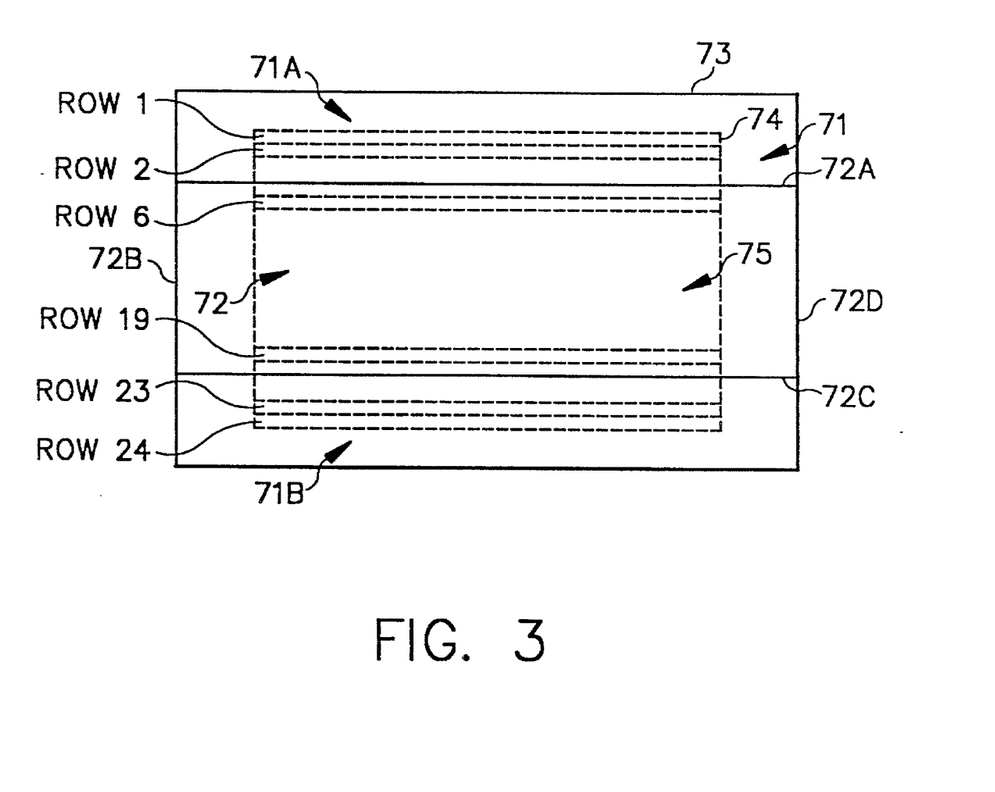
FIG. 3 is a a diagram of a frame area on a film strip useful in explaining the operation of the present invention.

In FIG. 3, the outer rectangle 73 represents a full size frame area 71 of 24×36 mm. The smaller rectangle bounded by 72a, 72b, 72c and 72d represents a panoramic frame area 72 of 13×36 mm. The areas 71a and 71b are non-panoramic frame areas within the full size frame area 71 but outside the panoramic frame area 72. The dotted line rectangle 74 defines the area 75 of the film strip that is scanned by the CCD scanner 32 at scanner station 22 of the printer 10. It will be seen that the scanned area 75 spans the panoramic frame area 72 and the non-panoramic frame areas 71a and 71b.

Figures 4, 4A:
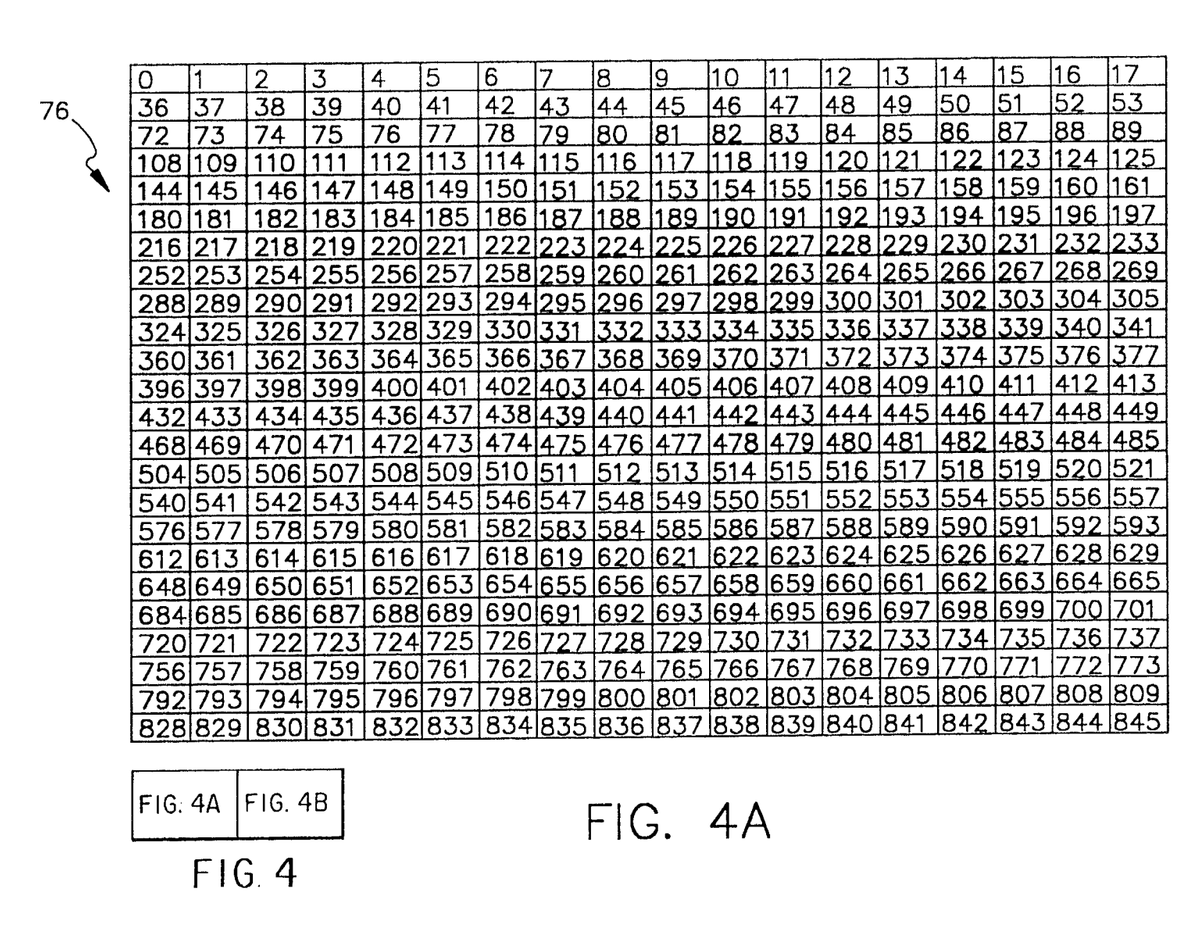
FIG. 4 is a diagram illustrating a scanned frame pixel matrix useful in explaining the present invention.

In FIG. 4, a matrix grid 76 of numbers is shown which corresponds to the columns and rows of pixel areas in the film scanned area 75 in FIG. 3. These pixel numbers are used in the algorithm of the invention. In this grid, pixel "0" is the upper left hand corner and pixel "863" is the lower right hand corner. Referring again to FIG. 3, it will be seen that the scanned area 75 is such that columns of pixel areas span the panoramic frame area 72 and a significant portion of the non-panoramic areas 71a and 71b. The pixel row numbers in FIG. 3 are the row numbers used in the algorithm.

Figure 5A:
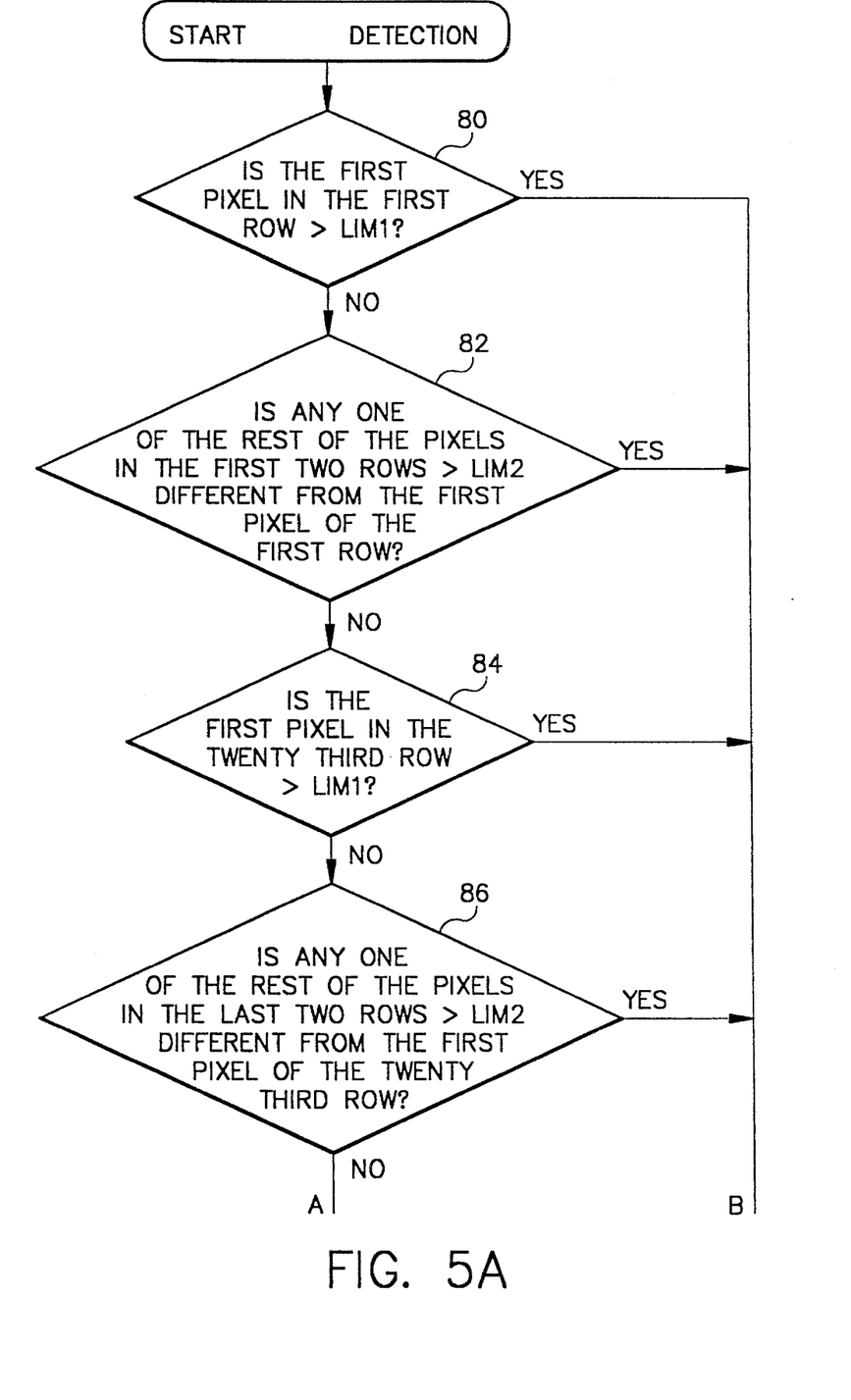
FIG. 5 is a flow chart used in describing the algorithm used in the present invention.
Figure 5B:
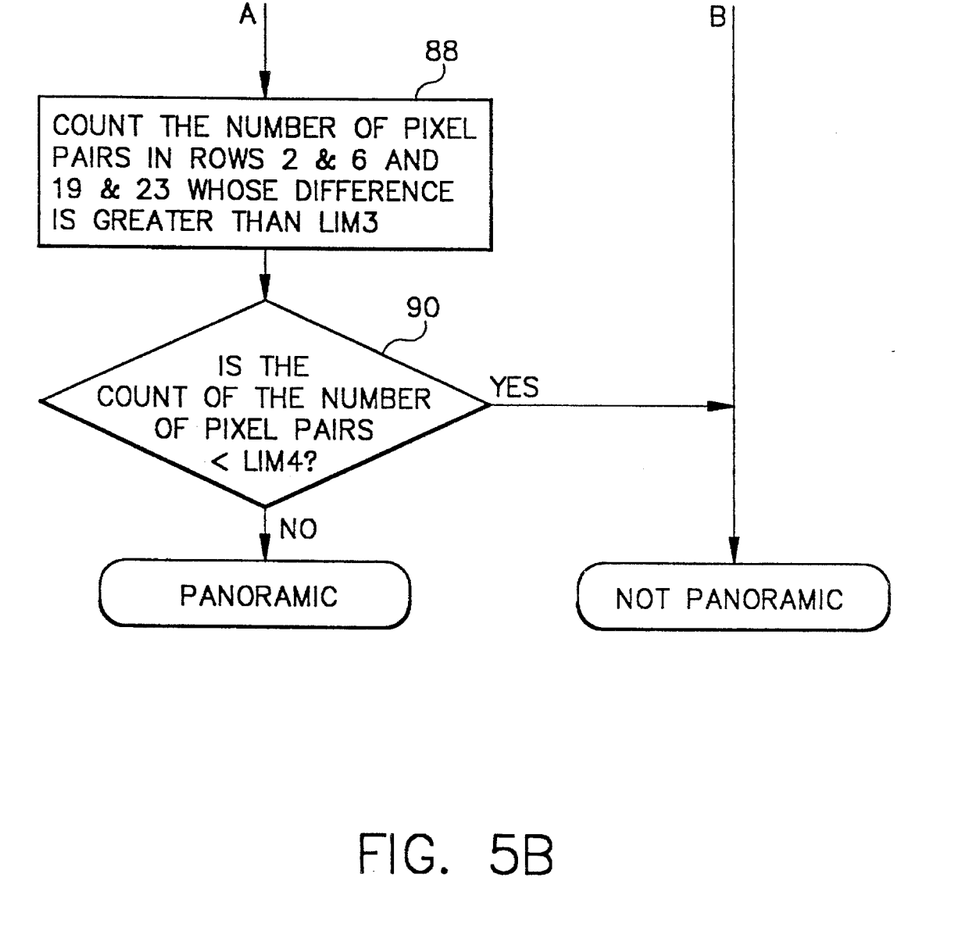

The basic flow of the presently preferred form of the algorithm of the invention for discriminating between full size and panoramic image frames is shown in the flow chart of FIG. 5. At the outset, the microcomputer is set to an initial indication that a film image frame scanned at the scanner station is a panoramic image. This initial assumption is held as being valid until any one of the ensuing conditions in the algorithm indicates that the image is not panoramic, whereupon the computer operates to print the image in normal, i.e. full size print mode. If none of the conditions is met, the initial computer-set indication that a panoramic image is present provides appropriate instructions to the print station to operate in an alternate mode to the normal full size print mode. In the alternate mode, if the printer is, as shown in FIG. 1, capable of being adjusted to do panoramic prints, the computer causes the magnification to be changed and the paper advance and paper mask to move appropriately to accommodate the longer print format. On the other hand, if the printer is not capable of doing panoramic prints in the alternate mode, the instruction causes the print station to skip the panoramic print thus saving unnecessary wastage of print paper. The panoramic print can later made at a separate panoramic-capable printer.

Referring more specifically to the flow chart of FIG. 5, at the start of panoramic detection query 80 tests the pixel film density datum value of the first pixel "0" in the first row of the scan area 75 to first determine if this pixel represents an unexposed pixel. It will be noted that this pixel is in the upper non-panoramic frame area 71a of the full size frame. If the density value of this pixel is greater than a predetermined limit value, LIM1, the determination is made that this is a full size image frame, i.e. non-panoramic, since the existence of film density in this area implies the existence of image information. The instruction is sent to print a full size print and the remainder of the detection program is bypassed thereby saving significantly in computation time.

If the pixel "0" tested value is less than or equal to LIM1, indicating the possible existence of a panoramic image, query 82 then compares the film density data values of the rest of the pixels (1 through 71) to the value of pixel "0". If any one of these remaining pixels differs from the first pixel by more than a second predetermined value, LIM2, then density modulation is found which implies the existence of some density in the row 1 and 2 portion of the non-panoramic frame area 71a. The determination is thus made that a non-panoramic image exists and the program is again exited as above with consequent savings in computation time.

If the determination of query 82 is negative, the program then repeats this process for the non-panoramic frame area 71b by first testing, in query 84, the datum value of the first pixel (no. 792) in row number 23 against the limit value, LIM1, and then comparing the value of each the remaining pixels (793 through 863) in rows 23 and 24 to the value of pixel 792 to see if any one difference is greater than limit value, LIM2. As with the non-panoramic area 71a, if the condition is met, a non-panoramic image is determined and the program is exited early with instruction to the printer to print in full size mode.

If the program tests negative to this point, the program then performs an "edge detection" procedure which looks for a transition in density between the panoramic frame area 75 and the non-panoramic frame areas 71a and 71b. To this end, instruction 88 compares the density values of corresponding pixels in rows on each side of boundary 72a separating the panoramic frame area 75 from the non-panoramic frame area 71a to derive differences between the corresponding pixel values. For example, the value of pixel 36 in row 2 is compared to the value of pixel 180 in row 6, then pixel 37 to pixel 181 and so on. Each time a pixel value difference greater than a third predetermined limit value, LIM3, is found, a count is incremented. A similar process is performed for corresponding pixels in rows 19 and 23 on either side of boundary 72c. After all 72 comparisons are made, the count of these "edge pixels" is compared to a fourth predetermined limit value, LIM4. If the count is greater than or equal to LIM4, the image is determined to be a panoramic image and the printer is instructed to print in one of the alternate printing modes. If the count is less than limit value, LIM4, the image is determined to be a non-panoramic image and the printer is instructed to print a full size print. The limit values LIM1 through LIM4 are empirically determined for the type of printer and the signal processing algorithm employed.

In Table I, the results of the foregoing algorithm in incorrectly identifying panoramic images, "false pan", is shown for three different settings of limit values LIM1 through LIM4 and also in comparison with operation of an algorithm of the type described in aforementioned U.S. Pat. No. 5,289,229. The results of Table I were obtained on a Kodak CLAS35 High Speed Automatic Printer. The values assigned to the limit values LIM1 through LIM4 are based on the signal processing logic referred to as T-space which is fully described in commonly assigned U.S. Pat. No. 4,159,174, the disclosure of which is incorporated herein by reference. In the table, the designations in the first column, except for the final entry, indicate different reels of full frame film images for a variety of scene populations used for test purposes, comprising over 26,000 different scenes. Also in the table, the column headed "Algo1" represents the results from an algorithm similar to the algorithm of the '229 patent but modified to look for $D_{min}$ in the outermost two rows of the upper and lower non-panoramic areas 71a and 71b of the scanned pixel matrix. The columns headed Algo3a through Algo3c represent results of the algorithms of the present invention for three different groups of limit value settings (LIM1 through LIM4). As can be seen in the table, as the limit values were made more restrictive, the algorithm called fewer full frame images "false panoramic images".

The final reel labelled "danpan" comprise 588 panoramic images and is used to evaluate the algorithm performance in detecting actual panoramic image frames. Although the number of incorrect detections for the algorithm of the invention is greater than for "Algo1", this is acceptable since mischaracterizing an actual panoramic image is less of a problem than falsely indicating a full frame image as being a panoramic image. Thus, the improved results in the upper portion of the table for the full frame image reels is of significantly greater benefit in the printing process than the slight reduction in detection reliability for the actual panoramic image frames.

TABLE I

| Image Scene Population Designation | total negs | algo1 | algo3a | algo3b | algo3c |
|---|---|---|---|---|---|
| | | Number of false panoramic images | | | |
| bag | 1348 | 18 | 0 | 0 | 0 |
| birthday | 1296 | 3 | 1 | 1 | 0 |
| boat | 1212 | 26 | 2 | 1 | 1 |
| cc_yacht | 1318 | 1 | 0 | 0 | 0 |
| coach | 1175 | 10 | 0 | 0 | 0 |
| denny_15 | 221 | 0 | 0 | 0 | 0 |
| dock | 878 | 4 | 1 | 1 | 0 |
| dp5 | 313 | 9 | 0 | 0 | 0 |
| dump | 1040 | 15 | 1 | 0 | 0 |
| fifi | 1043 | 2 | 0 | 0 | 0 |
| five | 1328 | 3 | 0 | 0 | 0 |
| fos2 | 644 | 1 | 0 | 0 | 0 |
| hat | 1470 | 3 | 0 | 0 | 0 |
| idano | 958 | 1 | 0 | 0 | 0 |
| kitchen | 1083 | 19 | 0 | 0 | 0 |
| kitty | 902 | 3 | 0 | 0 | 0 |
| mutt | 1089 | 30 | 0 | 0 | 0 |
| om | 1060 | 4 | 0 | 0 | 0 |
| omfff | 1180 | 12 | 0 | 0 | 0 |
| !phase1- | 839 | 6 | 0 | 0 | 0 |
| short_order | 656 | 3 | 0 | 0 | 0 |

TABLE I-continued

| Image Scene Population Designation | total negs | algo1 | algo3a | algo3b | algo3c |
|---|---|---|---|---|---|
| sotoo | 701 | 0 | 0 | 0 | 0 |
| statue | 1201 | 15 | 0 | 0 | 0 |
| swing | 714 | 1 | 0 | 0 | 0 |
| van | 1251 | 7 | 1 | 0 | 0 |
| wallphone | 1097 | 14 | 0 | 0 | 0 |
| total = | 26017 | 210 | 6 | 3 | 1 |
| % error = | | 0.807 | 0.023 | 0.012 | 0.004 |
| | | Number of panoramic images missed | | | |
| danpan | 588 | 7 | 24 | 29 | 40 |
| % error = | | 1.190 | 4.082 | 4.932 | 6.803 |
| LIM 1 | | −0.30 | −0.30 | −0.40 | −0.40 |
| LIM 2 | | 0.10 | 0.10 | 0.10 | 0.10 |
| LIM 3 | | — | 0.15 | 0.15 | 0.15 |
| LIM 4 | | — | 20 | 25 | 30 |

The particular algorithm written in C language and employed in a presently preferred embodiment of the invention follows:

```
static int DetectPanoramic3(int16 npix[ ])
{
    int i,firstpix,pixct;
    firstpix = npix[0];
    if (firstpix > PANORAMIC_L1)
        return (NOT_PANORAMIC);
    for (i = 1; i < 72; ++i)
        if (abs(firstpix − npix[1]) > PANORAMIC_L2)
            return (NOT_PANORAMIC);
    firstpix = npix[792];
    if (firstpix > PANORAMIC_L1)
        return (NOT_PANORAMIC);
    for (i = 793; i < 864; ++i)
        if (abs(firstpix − npix[i]) > PANORAMIC_L2)
            return (NOT_PANORAMIC);
    pixct = 0;
    for (i = 180; i < 216; ++i)
        if ((npix[i] − npix[i−144]) >
            PANORAMIC_L13) ++pixct;
    for (i = 648; i < 684; ++i)
        if ((npix[i] − npix[i+144]) >
            PANORAMIC_L13) ++pixct;
    if (pixct >= PANORAMIC_L4)
        return (PANORAMIC);
    else
        return (NOT_PANORAMIC);
}
```

The invention has been described with reference to a preferred embodiment. However, it will be appreciated that variations and modifications can be effected by a person of ordinary skill in the art without departing from the scope of the invention.

PARTS LIST

| 10 | photographic printer |
|---|---|
| 12 | film strip |
| 14 | film supply reel |
| 16 | film takeup reel |
| 18 | film drive |
| 20 | microcomputer |
| 22 | film scanner station |
| 24 | print station |
| 26 | film loop buffer stage |
| 28 | scanner lamp house |
| 30 | scanner lens optics |
| 32 | CCD sensor |
| 40 | printer station lamp house |
| 42 | printer lens optics |
| 44 | photographic print paper |
| 46 | print paper supply reel |
| 48 | print paper takeup reel |
| 50 | paper drive |
| 52 | printer lens drive |
| 60, 66 | film image frames - full size format |
| 62, 64 | film image frames - panoramic format |
| 70 | unexposed $D_{min}$ areas of film strip |
| 71 | full frame area |
| 71a, 71b | non-panoramic frame areas |
| 72 | panoramic frame area |
| 72a–72d | panoramic frame boundaries |
| 73 | outer rectanglular boundary of full frame area |
| 74 | rectangular boundary of film scan area |
| 75 | film scan area |

What is claimed is:

1. A method of discriminating between full size and panoramic images interspersed on a strip of film, a panoramic frame area being nested within a full size frame area leaving a non-panoramic frame area which is within the full size frame area but outside the panoramic frame area, the method comprising the steps of:

(a) determining from a film density datum value of at least one pixel in the non-panoramic frame area if the image is a full size image and, if not, (b) then performing a longitudinal edge detection operation to determine from film density data values of pixels in both the panoramic and non-panoramic frame areas if an edge exists between the two areas and, if so, the existence of a panoramic image is determined and, if not, a full size image is determined.

2. The method of claim 1 wherein said step (a) comprises:

(i) first determining from a datum value of a first pixel in the non-panoramic frame area if a full size image exists and, if not, (ii) then determining from density modulation information derived from a plurality of pixels along an extended length of the non-panoramic frame area if a full size image exists and, if not, proceeding to step (b).

3. The method of claim 2 wherein said step (a) is performed with pixels from non-panoramic frame areas both above and below said panoramic frame area before proceeding to step (b).

4. The method of claim 1 wherein in step (b) said edge detection operation is performed on both upper and lower boundaries of said panoramic frame area before discrimination between the existence of a panoramic or full size image is made.

5. A method of discriminating between full size and panoramic size images interspersed on a strip of film, a panoramic frame area being nested within a full size frame area leaving a non-panoramic frame area which is within the full size frame area but outside the panoramic frame area, the method comprising the steps of:

(a) scanning image frames on the film strip to derive film density data for a two dimensional matrix of image pixels spanning said panoramic and non-panoramic frame areas;

(b) initially setting an indication that a scanned image frame is a panoramic image until one of the determining conditions set forth in the following steps is met whereupon an indication is then set that the image frame is a full size image;

(c) determining if the film density datum value of a first predetermined pixel in the non-panoramic frame area is above a first predetermined limit value;

(d) comparing film density data values of a plurality of pixels from the non-panoramic frame area to said first pixel datum value and determining if any one of said plurality of data values differs from said first datum value by more than a second predetermined limit value; and (e) comparing film density data values from corresponding pixels on each side of a boundary separating the panoramic frame area from the non-panoramic frame area to derive differences in data values between said corresponding pixels and determining if the number of comparisons in which the density value differences exceed a third predetermined limit value is less than a fourth predetermined limit value.

6. The method of claim 5 wherein the determination of step (c) is made from the first pixel datum value in an outermost row of said pixel data.

7. The method of claim 5 wherein the comparing of step (d) is made from datum values of pixels in a pair of outermost rows from said non-panoramic frame area.

8. The method of claim 7 wherein the comparing step (d) is performed for datum values of pixels in non-panoramic frame areas above and below said panoramic frame area.

9. The method of claim 5 wherein the comparing step (e) is performed for boundaries separating both upper and lower non-panoramic frame areas from the panoramic frame area.

10. Apparatus for discriminating between full size and panoramic size image frames interspersed on a strip of film, a panoramic frame area being nested within a full size frame area leaving a non-panoramic frame area which is within the full size frame area but outside the panoramic frame area, the apparatus comprising:

a film scanner for deriving film density data for each of a two-dimension matrix of pixels in an area spanning both the panoramic and non-panoramic frame areas;

pixel data processing means, initially set to an indication of a panoramic image frame, for processing said pixel density data to first determine from film density datum value of at least one pixel in the non-panoramic frame area if the image is a full size image and, if not, then to determine from film density data values of pixels in both the panoramic and non-panoramic frame areas if an edge exists between the two areas; and means responsive to said first determination from said datum value of said at least one pixel in the non-panoramic frame area for supplying a print mode output signal to a photographic printer only if a determination is made that a full size image exists, said output signal enabling said printer to print said image in the full size mode, and otherwise responsive to said edge determination for supplying a print mode output signal to said photographic printer to enable printing of said image in a panoramic mode if existence of an edge is determined and otherwise to print in a full size mode if an edge is not detected.

11. A photographic printer adapted for discrimination between full size and panoramic size image frames interspersed on a strip of film, a panoramic frame area being nested within a full size frame area leaving a non-panoramic frame area which is within the full size frame area but outside the panoramic frame area, the printer comprising:

a film scanner for deriving film density data for each of a two-dimension matrix of pixels in an area spanning both the panoramic and non-panoramic frame areas;

pixel data processing means, initially set to an indication of a panoramic image frame, for processing said pixel density data to first determine from film density datum value of at least one pixel in the non-panoramic frame area if the image is a full size image and, if not, then to determine from film density data values of pixels in both the panoramic and non-panoramic frame areas if an edge exists between the two areas;

a print station adapted to print a non-panoramic print in the case of a full size image on the film and to operate in a predetermined alternate mode in the case of a panoramic image on the film; and printer control means responsive to said first determination from said datum value of said at least one pixel in the non-panoramic frame area for supplying a print mode control signal to a photographic printer only if a determination is made that a full size image exists, said output signal enabling said printer to print said image in the full size mode, and otherwise responsive to said edge determination for supplying a control signal to said photographic printer to enable said print station to operate in said alternate mode if an edge is determined and to print said image in a full size mode if an edge is not detected.

\* \* \* \* \*